United States Patent
Cheah

(10) Patent No.: US 7,036,808 B2
(45) Date of Patent: May 2, 2006

(54) PROCESSING SYSTEM

(75) Inventor: Singee Cheah, Everett (CA)

(73) Assignee: Honda Canada Inc., Scarborough (CA)

( * ) Notice: Subject to any disclaimer, the term of this patent is extended or adjusted under 35 U.S.C. 154(b) by 0 days.

(21) Appl. No.: 10/964,983

(22) Filed: Oct. 14, 2004

(65) Prior Publication Data

US 2005/0062207 A1    Mar. 24, 2005

Related U.S. Application Data

(62) Division of application No. 10/606,818, filed on Jun. 26, 2003.

(60) Provisional application No. 60/392,453, filed on Jun. 28, 2002.

(51) Int. Cl.
B25B 1/04 (2006.01)
B25B 5/04 (2006.01)
B25B 1/20 (2006.01)
B25B 1/00 (2006.01)

(52) U.S. Cl. .................. 269/239; 269/43; 269/152; 269/154; 269/32; 269/237; 29/559

(58) Field of Classification Search .................. 269/43, 269/152, 154, 32, 237, 239; 29/559
See application file for complete search history.

(56) References Cited

U.S. PATENT DOCUMENTS

| | | | |
|---|---|---|---|
| 2,019,789 A | | 11/1935 | Mahannah |
| 2,108,077 A | | 2/1938 | Robinson |
| 2,432,352 A | | 12/1947 | Strotz |
| 2,568,905 A | * | 9/1951 | Wiehsner ............... 164/409 |
| 3,827,683 A | * | 8/1974 | Seborg et al. ............ 269/9 |
| 3,982,739 A | * | 9/1976 | Maes .................... 269/37 |
| 4,241,906 A | | 12/1980 | Cole |
| 4,341,375 A | | 7/1982 | Romanin |
| 4,699,363 A | | 10/1987 | Semmier |
| 5,022,636 A | | 6/1991 | Swann |

(Continued)

FOREIGN PATENT DOCUMENTS

GB    2058636    8/1980

(Continued)

*Primary Examiner*—Joseph J. Hail, III
*Assistant Examiner*—Bryan R. Muller
(74) *Attorney, Agent, or Firm*—Rankin, Hill, Porter & Clark LLP

(57) ABSTRACT

A clamp device including a support frame member, a lower clamp unit and an upper clamp unit supported by the support frame member. The lower clamp unit has a pair of lower jaws and a first actuator for actuating at least one of the lower jaws between clamped and unclamped positions. The upper clamp unit has a first upper jaw and a second upper jaw, and a second actuator for actuating at least one of the upper jaws between clamped and unclamped positions, the first upper jaw being fixed for movement with one of the lower jaws.

17 Claims, 8 Drawing Sheets

U.S. PATENT DOCUMENTS

| | | |
|---|---|---|
| 5,240,051 A | 8/1993 | Quick et al. |
| 5,242,159 A | 9/1993 | Bernstein |
| 5,351,943 A | 10/1994 | Milz |
| 5,458,321 A | 10/1995 | Durfee, Jr. |
| 5,551,676 A | 9/1996 | Tibbet |
| 5,580,035 A | 12/1996 | Ffeld et al. |
| 5,595,378 A | 1/1997 | Matinsson et al. |
| 5,619,781 A | 4/1997 | Ffield et al. |
| 5,971,378 A | 10/1999 | Sweeney |
| 5,984,288 A | 11/1999 | Kipping |
| 6,003,851 A | 12/1999 | Araki et al. |
| 6,322,063 B1 | 11/2001 | Steinhart |
| 6,488,060 B1 * | 12/2002 | Giovanni ............ 144/2.1 |

FOREIGN PATENT DOCUMENTS

| | | | |
|---|---|---|---|
| GB | 2058636 A | * | 4/1981 |
| GB | 2263432 | | 1/1993 |
| GB | 2263432 A | * | 7/1993 |
| GB | 2308680 | | 12/1996 |
| GB | 2378683 | | 5/2001 |

* cited by examiner

PROCESSING SYSTEM

REFERENCE TO CO-PENDING APPLICATIONS

The entire subject matter of U.S. Provisional application Ser. No. 60/392,453 filed Jun. 28, 2002 and entitled CLAMPING SYSTEM is incorporated by reference. The applicant claims priority benefit under Title 35, United States Code, Section 119(e) of U.S. Provisional application Ser. No. 60/392,453 filed Jun. 28, 2002 and entitled CLAMPING SYSTEM.

The present application is a divisional of pending application Ser. No. 10/606,818, filed Jun. 26, 2003.

BACKGROUND OF THE INVENTION

1. Field of the Invention

The present invention relates to the work piece processing systems, more particularly to devices and methods for clamping such work pieces.

2. Description of the Related Art

Like most others, the automobile industry is highly competitive and the companies in it are striving to improve productivity at every step. One important aspect of the automobile manufacturing is the ability to switch dies and jigs in a relatively short period of time to accommodate a model change. Commonly, a set-up jig is used to position a work piece in a processing operation such as spot welding operation. The set-up jig is provided with a number of clamp devices which clamp a designated clamping site on the work piece. The clamps are automated so that they can be quickly opened and closed to handle successive work pieces in a production line.

Each clamp device has a pair of templates which provide clamp surfaces accommodating the shape or profile of the work piece at the corresponding clamping site. Accordingly, the set-up jig is operable to receive and to clamp the work piece with a plurality of clamps, each operating at a designated clamping site from one work piece to the next throughout the production run for a particular model.

It is not uncommon for the production line to process two or more work piece types which have identical clamping sites but which requires different templates because of changes in shape or profile from one work piece type to the next. This can occur, for example, where work pieces for successive production runs are door panels or trunk lids for different models of the same vehicle. In these cases, then, the locations of the clamps do not need to be changed between production runs. However, a production Associate must still shut the line down to make manual adjustments to each clamp device to replace the templates for the previous work piece type with a new set of templates. This can be a time consuming process in some cases and in others cause subtle changes in the clamping surfaces which can in turn cause undesirable fluctuations in quality from one production run to the next.

It is therefore an object to provide a novel processing system.

SUMMARY OF THE INVENTION

In one of its aspects, the invention involves a clamp device comprising a support frame member, a lower clamp unit and an upper clamp unit supported by the support frame member, the lower clamp unit having a pair of lower jaws and first actuating means for actuating at least one of the lower jaws between clamped and unclamped positions, the upper clamp unit having a first upper jaw and a second upper jaw, and a second actuating means for actuating at least one of the upper jaws between clamped and unclamped positions.

Preferably, the first upper jaw is fixed for movement with one of the lower jaws.

In one preferred embodiment, the device further comprises displacement means for displacing the second upper jaw between the unclamped position and an inoperable position. The lower clamp unit further comprises a lower anchor portion mounted on the support frame member. In this case, a first of the lower jaws is movable relative to the lower anchor portion and a second lower jaw is fixedly mounted to the lower anchor portion.

Preferably, the first lower jaw includes a first member pivotally coupled to the lower anchor portion for movement about a first axis and a second member coupled to the first member.

Preferably, the upper clamp unit further comprises an upper anchor portion which is mounted on the support frame member. In this case, the second upper jaw is movable relative to the upper anchor portion and includes a third member pivotally coupled to the upper anchor portion for movement about a second axis and a fourth member which is coupled to the third member.

In this case, the second and fourth frame members include templates which may include, in one example, specially shaped clamp surfaces for clamping the workpiece. In some cases, the upper and lower clamp units may share a common anchor portion, or the upper and lower anchor portions may be part of a common anchor member. Alternatively, the upper and lower clamp units may have separate anchor members.

Preferably, each of the first and second actuating means includes a linear or rotary, hydraulic or pneumatic drive member.

Preferably, the device further comprises control means for controlling the drive member, the control means operable in:
a first phase to actuate the lower clamp unit between unclamped and clamped positions;
a second phase to actuate the second upper clamp member between the unclamped and inoperative positions; and
a third phase to actuate the upper clamp unit between the unclamped and clamped positions.

In another of its aspects, there is provided a clamp device capable of clamping two different work pieces, comprising a lower pair of clamp members and an upper pair of clamp members, actuating means for independently actuating the lower and upper clamp members between respective clamped and unclamped positions, at least one of the upper clamp members being moveable between the unclamped position and a retracted position wherein the upper pair of clamp members are inoperable.

In one embodiment, one of the upper clamp members is fixed to one of the lower clamp members. At least one of the lower clamp members is movable about a first axis and, at least one of the upper clamp members is movable about a second axis.

In still another of its aspects, there is provided a clamp device capable of clamping two different work pieces, comprising a lower jaw unit, an intermediate jaw unit and an upper jaw unit, the lower jaw unit and the intermediate jaw unit having adjacent clamp surfaces to clamp a first work piece, the intermediate jaw unit and the upper jaw unit having adjacent clamp surfaces to clamp a second work piece, first actuating means for actuating either the lower jaw unit or the intermediate jaw unit or both to clamp the first work piece, second actuating means for actuating either the intermediate jaw unit or the upper jaw unit or both to clamp the second work piece, the upper jaw unit or the lower jaw unit being movable between an operative position and a retracted position, the retracted position being selected to permit the first work piece to be clamped and the operative position being selected to permit the second work piece to be clamped.

In yet another of its aspects, there is provided a work piece clamp assembly for supporting at least two different work pieces, comprising a frame, a plurality of clamp devices mounted on the frame and operable in a first phase to clamp a first work piece at a corresponding plurality of clamping sites thereon and in a second phase to clamp a second work piece at a corresponding plurality of clamping sites thereon, wherein the clamping sites on the first work piece are in substantially the same location as the clamping sites on the second work piece, each of the clamp devices having a lower pair of clamp members and an upper pair of clamp members, actuating means for independently actuating the lower and upper clamp members between respective clamped and unclamped positions, at least one of the upper clamp members or at least one of the lower clamp members being moveable between the unclamped position and a retracted position wherein the corresponding upper pair of clamp members or lower pair of clamp members are inoperable.

In yet another of its aspects, there is provided a work piece clamp assembly for supporting at least two different work pieces, comprising a frame, a plurality of clamp devices mounted on the frame and operable in a first phase to clamp a first work piece at a corresponding plurality of clamping sites thereon and in a second phase to clamp a second work piece at a corresponding plurality of clamping sites thereon, wherein the clamping sites on the first work piece are in substantially the same location as the clamping sites on the second work piece, each clamp device comprising a lower jaw unit, an intermediate jaw unit and an upper jaw unit, the lower jaw unit and the intermediate jaw unit having adjacent clamp surfaces to clamp a first work piece, the intermediate jaw unit and the upper jaw unit having adjacent clamp surfaces to clamp a second work piece, first actuating means for actuating either the lower jaw unit or the intermediate jaw unit or both to clamp the first work piece, second actuating means for actuating either the intermediate jaw unit or the upper jaw unit or both to clamp the second work piece, the upper jaw unit being movable between an operative position and a retracted position, the retracted position being selected to permit the first work piece to be clamped and the operative position being selected to permit the second work piece to be clamped.

In yet another of its aspects, the present invention provides a clamp device comprising a support frame member, a lower clamp unit and an upper clamp unit supported by the support frame member, the lower clamp unit having a pair of lower jaws and first actuating means for actuating at least one of the lower jaws between clamped and unclamped positions, the upper clamp unit having a first upper jaw and a second upper jaw, and a second actuating means for actuating at least one of the upper jaws between clamped and unclamped positions, the first upper jaw being fixed for movement with one of the lower jaws.

In still another of its aspects, the present invention provides a method of clamping two or more groups of work pieces, comprising the steps of:

providing a lower clamp unit and an upper clamp unit;

providing the lower clamp unit with a pair of lower jaws;

actuating at least one of the lower jaws between clamped and unclamped positions, firstly to receive each of the first group of work pieces, and secondly to clamp each of the first group of work pieces, for processing each of the first group of work pieces;

providing the upper clamp unit with a pair of upper jaws; and actuating at least one of the upper jaws between clamped and unclamped positions, thirdly to receive each of the second group of work pieces, and fourthly to clamp each of the second group of work pieces for processing each of the second group of work pieces.

In one embodiment, the method further comprises the step of rendering the upper clamp unit inoperable during the actuation of the lower clamp unit.

In another embodiment, the method further comprises the step of rendering the lower clamp unit inoperable during the actuation of the upper clamp unit.

In one embodiment, the method includes the step of joining together one jaw of each clamp unit. In one example, the joining step includes the step of joining adjacent jaws of the upper and lower clamp units.

In one embodiment, the method further comprises the step of offsetting one of the clamp units at an angle relative to the other of the clamp units.

In still another aspect of its aspects, the present invention provides a method of clamping two or more groups of work pieces, comprising:

a step for providing a support frame member, a step for providing a first clamp unit and a second clamp unit supported by the support frame member, a step for providing the each the first and second clamp units with a pair of clamp members;

a step for joining one of the clamp members of the first clamp unit with one of the clamp members of the second clamp unit;

a step for actuating the second clamp unit to a position where it does not obstruct the operation of the first clamp unit;

a step for actuating the first clamp unit to clamp at least one first work piece;

a step for actuating the first clamp unit to a position where it does not obstruct the operation of the second clamp unit; and a step for actuating the second clamp unit to clamp at least one second work piece.

BRIEF DESCRIPTION OF THE DRAWINGS

Several preferred embodiments of the present invention will now be described, by way of example only, with reference to the appended drawings in which:

FIG. 5b is a sectional view of a yoke assembly shown in FIG. 5a;

DESCRIPTION OF THE PREFERRED EMBODIMENTS

Figure 1:
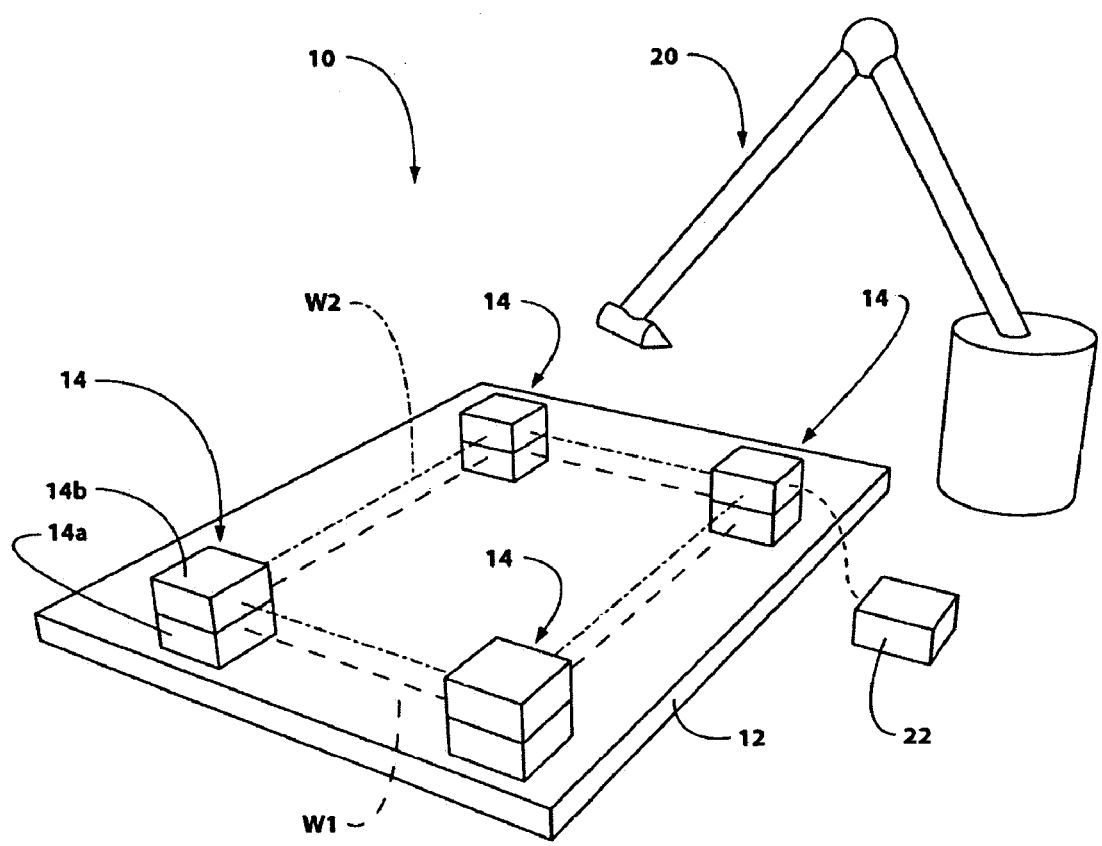
FIG. 1 is a perspective schematic view of a processing system.

Referring to the figures, particularly FIG. 1, there is provided processing system 10 which has a set-up jig with support frame member 12 and a number of clamp devices 14 mounted on the support frame member. As will be described, each clamp device 14 has a lower clamp unit shown by a lower rectangular block 14a and an upper clamp unit similarly shown by an upper rectangular block 14b. Each of the lower clamp units 14a cooperate to clamp a first work piece shown in dashed lines at W1, while each of the upper clamp units 14b cooperate to clamp a second work piece shown in chain-dotted lines at W2. A robotic work piece processor is shown at 20 in the vicinity of the support frame member and is operable to conduct any one of a number of process operations on the work piece, such as drilling, spot-welding, arc welding, inert gas welding (known as TIG and MIG), grinding, painting or the like.

A controller is provided at 22 which controls the timing and operation of the clamp devices.

In this case, work pieces W1 and W2 have a substantially common outer periphery, owing to their substantially identical profile as viewed in plan. The differences between W1 and W2 may be relatively modest, for example by having a slightly different shape of a door skin for a vehicle to reflect different models of the same vehicle type. In this case, the differences in the upper and lower clamp units 14a, 14b may be relatively minor since the changes do not amount to a change in the clamp regions on W1 and W2. On the other hand, the differences may be more pronounced, where the clamping surfaces are sufficiently different to require different clamp orientations to accommodate them. The processing system 10 may be configured to accommodate both the modest differences as well as the more pronounced differences between W1 and W2 by the use of clamp templates which tailor the clamp surfaces to the work piece and shims, as will be described.

Figure 2:
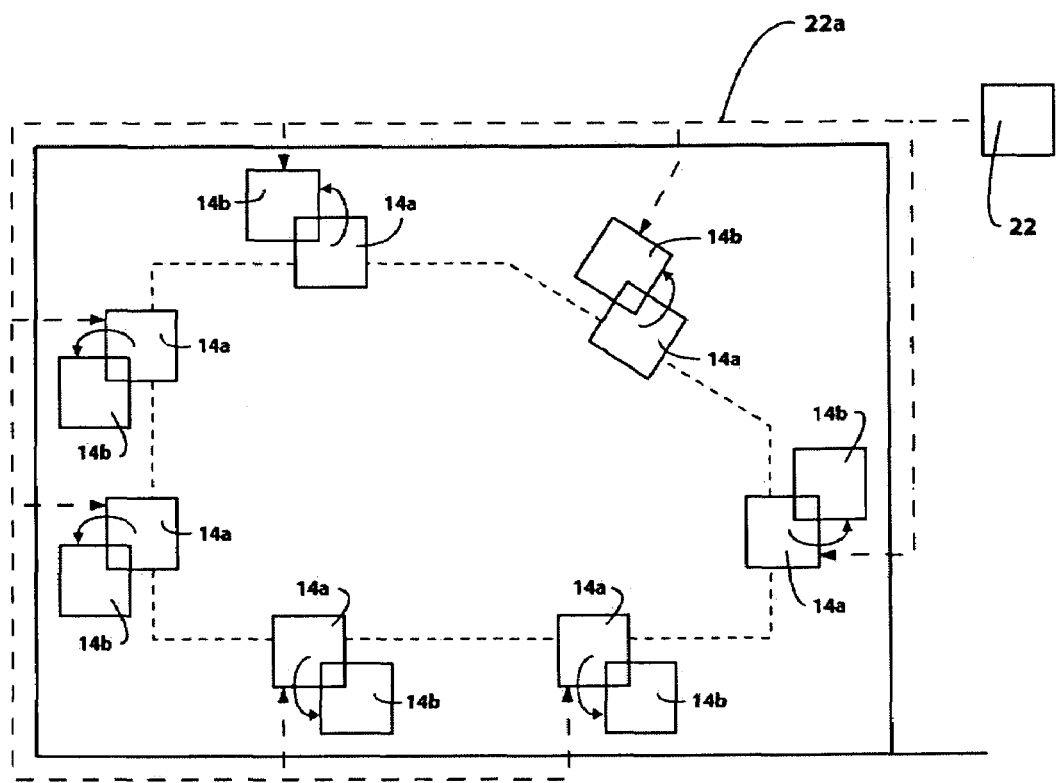
FIG. 2 is a schematic plan view of another processing system.

FIG. 1 schematically illustrates the system with the work piece in rectangular form. FIG. 2, on the other hand, schematically illustrates a plan view of another processing system whose set up jig is clamping a door frame. In this case, the controller is seen to communicate with each of the clamp devices 14 by way of communication channel 22a, the nature of which will depend on the manner by which the controller performs this function. FIG. 2 also schematically illustrates, in this case, the lower clamp units 14a in an operative position to engage the door panel and the upper clamp units 14b in their inoperative positions (the latter shown by the rectangle 14b offset from the rectangle 14a).

The controller may include a general purpose computer or a PLC, for example, and programmed to integrate the operation of the processing system 10 with the production line in which it is located. The general purpose computer may work within a network involving several general purpose computers, for example those sold under the trade names APPLE or IBM, or clones thereof, which are programmed with operating systems known by the trade names WINDOWS, LINUX or other well known or lesser known equivalents of these. The system may involve pre-programmed software using a number of possible languages or a custom designed version of a programming software sold under the trade name ACCESS or similar programming software. The computer network 22 may be a wired local area network, or a wide area network such as the Internet, or a combination of the two, without or without added security, authentication protocols, or under "peer-to-peer" or "client-server" or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH and the like, or other well known Internet, wireless, satellite or cell packet protocols. The system may, alternatively, be executed on a single custom built computer which is dedicated to the function of the system alone.

Figure 3A:
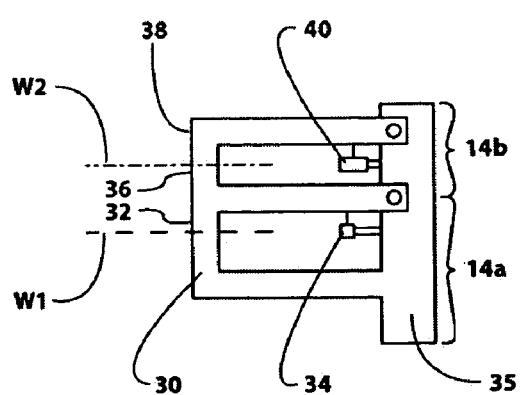
FIGS. 3a, 3b are schematic views of a portion of the processing system of FIG. 1.
Figure 3B:
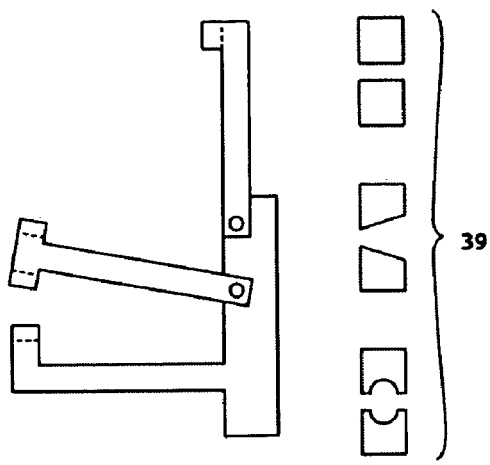

The upper and lower clamp units themselves are shown schematically in FIGS. 3a and 3b. The lower clamp unit 14a has a pair of jaws 30, 32 and first actuator 34 for actuating at least one of the lower jaws between clamped and unclamped positions. In this case, the jaw 30 is fixed to an anchor portion 35 while the jaw 32 is rotatable relative to it. The upper clamp unit has a first upper jaw 36 and a second upper jaw 38, as well as a second actuator 40 for actuating at least one of the upper jaws between clamped and unclamped positions. In this case, the first upper jaw 36 is fixed for movement with jaw 32. In this case, the actuator 40 also performs the function of a displacement means for second upper jaw between the unclamped position and an inoperable position, as shown in FIG. 3b, for example to permit the lower clamp unit to function while being unobstructed by the upper clamp unit.

Thus, as schematically represented in FIGS. 3a and 3b, the clamp device enables the work pieces W1, W2 to be clamped at essentially the same clamping sites without the need for a manual adjustment of the clamp to adjust the change in the work piece. In this case, the lower jaws 30, 32 hold the work piece W1 in place while the upper jaws 36, 38 hold work piece W2 in place. Each of the jaws may, if desired, be provided with a number of changeable templates which are specific to the particular work piece being processed, as shown schematically at 39 in FIG. 3b. In other words, even though two successive work piece types may have common clamping sites, they may involve different templates to accommodate differences in profile, shape or the like from one work piece type to another.

Figure 3C:
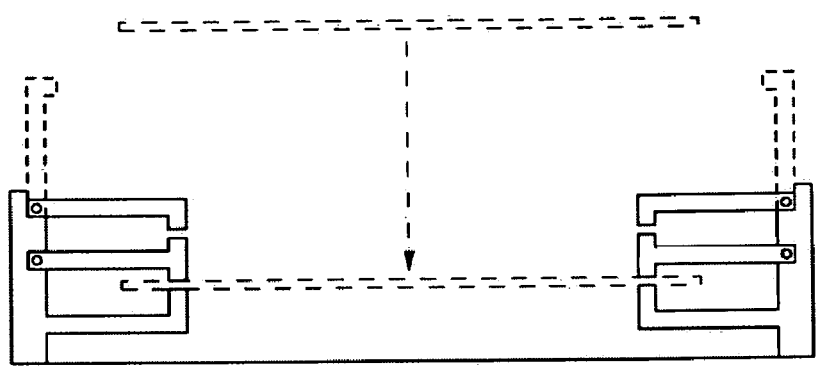
FIG. 3c is another schematic view of the processing system of FIG. 1.
Figure 4A:
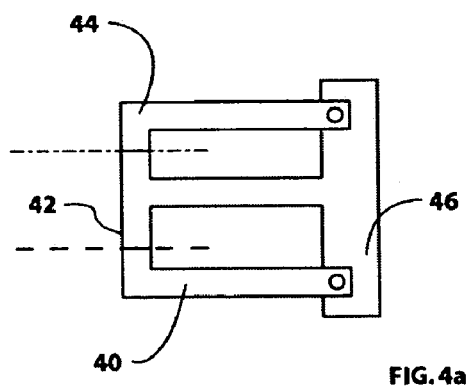
FIGS. 4a, 4b are schematic views of an alternative to the portion of the processing system illustrated in figures 3a and 3b.
Figure 4B:
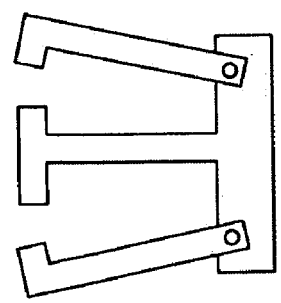

FIGS. 4a and 4b show an alternative version of the device shown in FIG. 3 which has a lower jaw 40, an intermediate jaw 42 and an upper jaw 44. In this case, the intermediate jaw is fixed relative to an anchor portion 46 and the upper and lower jaws are movable relative to it.

Figure 5A:
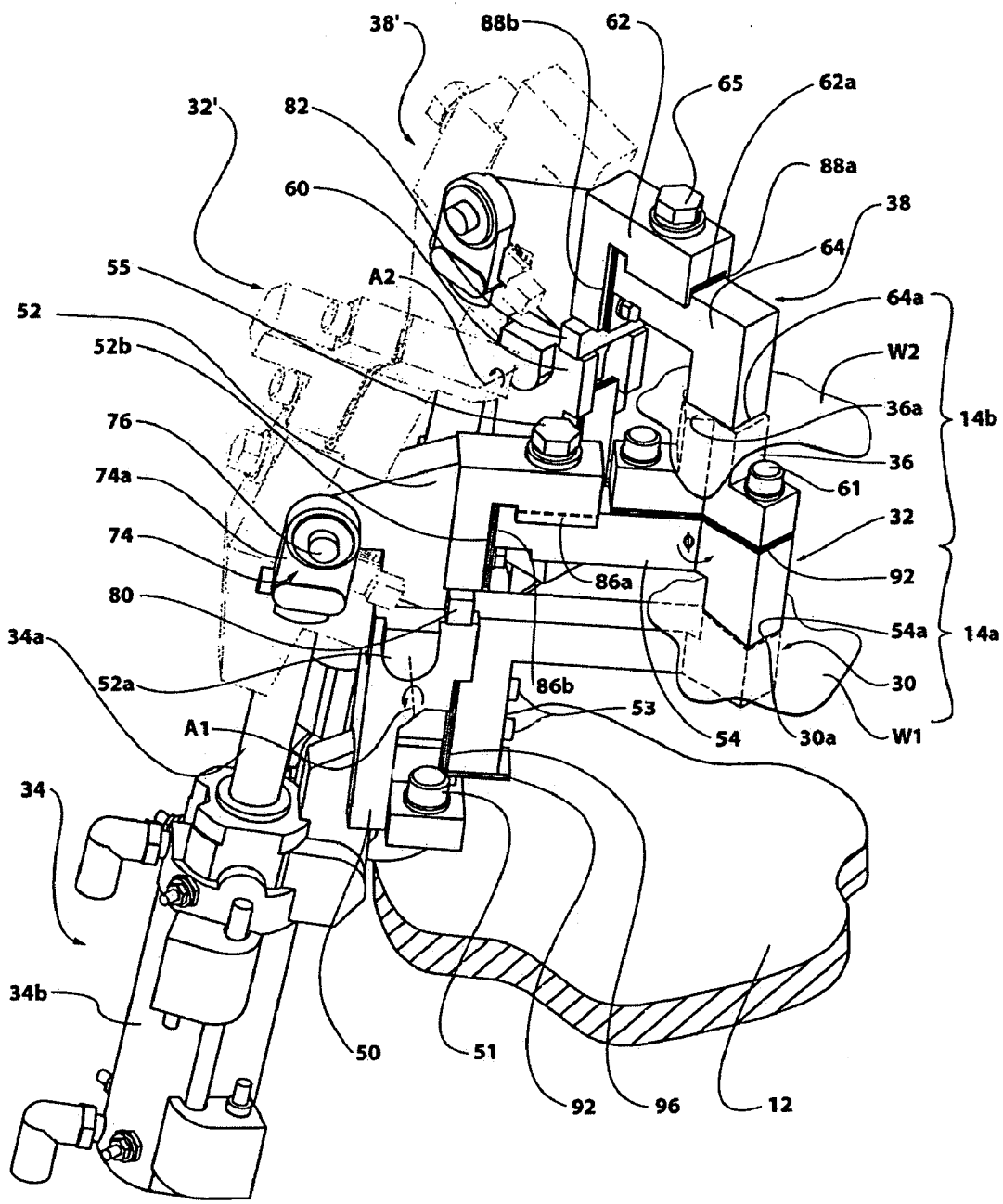
FIG. 5a is a fragmentary perspective view of a portion of another processing system.
Figure 5B:
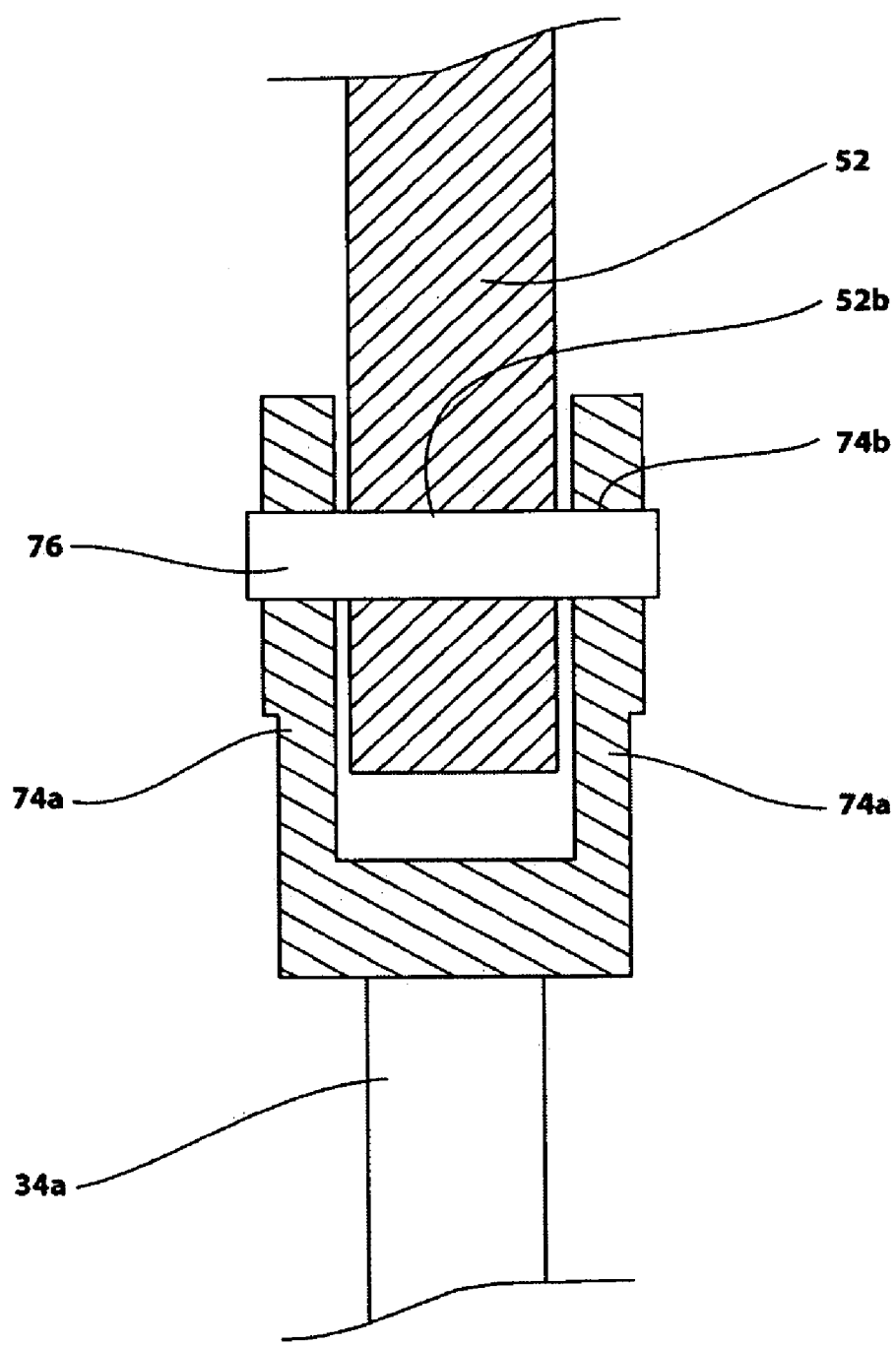

FIGS. 5a and 5b provide a practical example of the clamp device shown in FIGS. 3a, 3b. The lower clamp unit 14a further comprises a lower anchor portion 50 mounted on the support frame member 12, by way of fastener 51. A first of the lower jaws (in this case the jaw 32) is movable relative to the lower anchor portion 50, while the jaw 30 is fixedly mounted to the lower anchor portion 50. In this case, jaw 30 is fastened to the lower anchor portion 50 by way of fasteners 53.

More particularly, the jaw 32 includes a first member 52 pivotally coupled to the lower anchor portion 50 for movement about a first axis A1 by way of pivot portion 52a, which is positioned in a saddle portion for pivotal movement. A second member 54 is coupled to the first member 52 by way of fastener 55. In this case, the second member 54 further includes a clamp surface 54a to function with a neighbouring clamp surface 30a on the jaw 30 to hold work piece W1 (shown in dashed lines) in the clamped position.

The upper clamp unit 14b has an upper anchor portion 60 which, like the lower anchor portion, is mounted on the support frame member 12. In this case, the lower and upper anchor portions stand adjacent one another on the support frame member 12. The upper clamp unit includes jaw 36 which is also coupled to the second member 54 of the lower clamp unit 14a by way of fasteners 61. In this case, then, the jaw 36 travels with the second member 54. The jaw 38 also includes a third member 62 pivotally coupled to the upper anchor portion 60 for movement about a second axis A2 and a fourth member 64 which is coupled to the third member, by way of fastener 65. The fourth member 64 has a neighbouring clamp surface 64a to function with a neighbouring clamp surface 36a on the jaw 36 to hold work piece W2 (shown in dashed lines) in the clamped position.

In this case, the lower jaw member 30 is removably mounted to the lower anchor portion 50, in the same manner that members 54 and 64 are removably mounted to corresponding members 52 and 62 to allow for changes to the clamp to provide different templates for different work piece types.

Figure 5C:
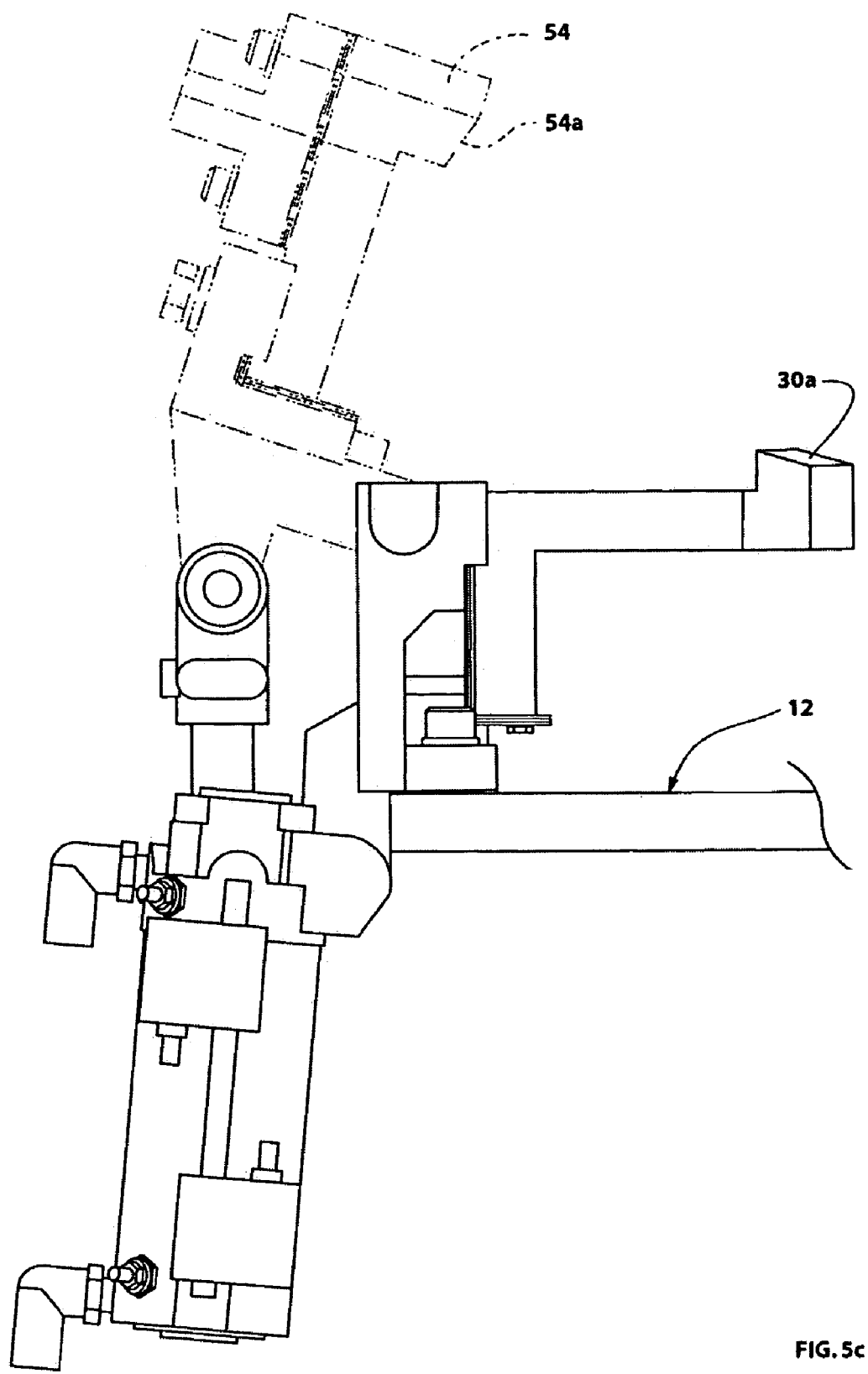
FIG. 5c is a side view of the portion shown in FIG. 5.

Referring to FIGS. 5a, 5b and 5c, each of the first and second actuators 34, 40 includes a linear pneumatic drive member, otherwise known as a pneumatic ram, as shown at 34a for actuator 34, mounted for movement relative to a cylinder 34b. The ram 34a has a yoke assembly 74 which is coupled to a corresponding first member 52. In this case, the yoke assembly 74 has a pair of spaced flanges 74a, which extend on opposite sides of the first member 52. The first member 52 has a pivot passage 52b aligned with a pair of pivot passages 74b in the flanges 74a, to receive a pivot member 76. Alternatively, the actuators 34, 40 may be hydraulic rams, electrically motor-controlled linear actuators, or other actuator forms including rotary actuators such as gears or belts or, driving by stepping motors or the like. Still further, the actuators may be electromagnetically actuated. The clamp device may be actuated in some other fashion to render the upper clamp unit 14b (or the lower clamp unit, as the case may be) inoperable. For example, the upper clamp unit 14b may be translated in a non rotational fashion to the inoperable position, such as a lateral shift or rotation about a vertical axis as shown schematically in FIG. 1. Alternatively, the upper clamp unit may be arranged so that its unclamped position corresponds also to a position where it does not obstruct the operation of the lower clamp, thus avoiding separate unclamped and inoperable positions, if need be.

Each clamp member is also provided with a hard stop, one shown at 80 for clamp 14a positioned on a lower surface of the first member 52 adjacent the pivot axis A1 of first member 52 and another shown at 82 positioned on a lower surface of the third member 62 adjacent to pivot axis A2. Both the second and fourth members 54, 64 are mounted on the respective first and third members 52, 62 in a manner which allows shims to be utilized for fine adjustments.

It can be seen that shims 86a are located between the first and second members at fastener 55. The shims 86a are shown in dashed lines because they are concealed in an inner cavity of the first member 52. In addition, shims 86b are located between the first and second members 52, 54 in a partial enclosure formed in a lower surface of the first member 52 as shown at 52b. Similarly, the fourth member 64 is mounted on the third member 62 with shims 88a, 88b there between. The shims 88 are clearly seen, in this case, to be located in an inner cavity 62a of the third member 62.

Shims are also provided as shown at 92 between clamp member 36 and second member 54 to allow for the fine adjustment of the clamp member 36 as mentioned above. In this particular case, the shims 92 account for the absence of work piece W1 between the camp members 30, 32 in which case the hard stop 80 withstands the compressive forces exerted between the clamp members 36, 38 since the camp members 30, 32 may in this case be separated from one another with nothing between them.

Finally, shims are also provided at 94, 96 between the clamp member 30 and the lower anchor portion 50 for fine adjustment of the clamp member 30. Therefore, the hard stops provide a coarse travel limit for the clamp members 32, 38 while the shims provide for fine adjustment to provide suitable clamping of the work piece while avoiding detrimental damage to the work piece. On the other hand, there may be cases where the shims are provided to cause intentional deformation of the work piece.

Figure 6:
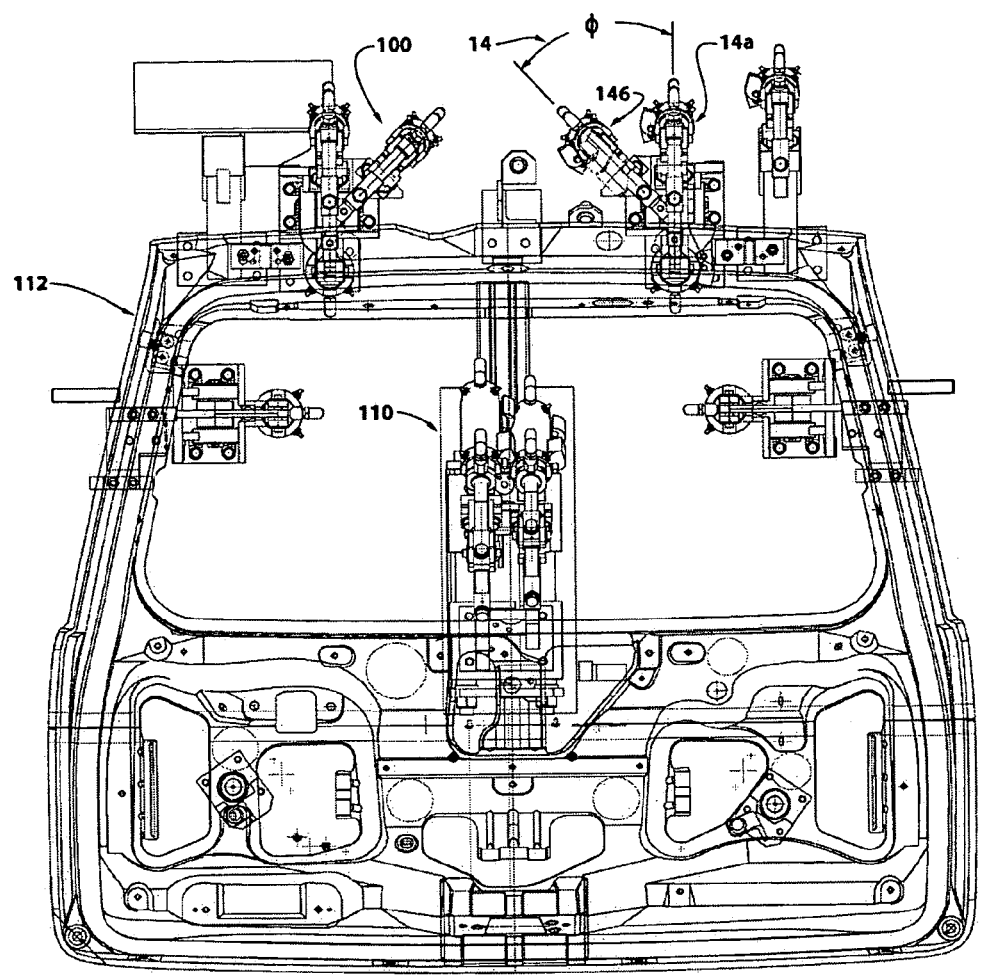
FIG. 6 is a plan view of the processing system of FIG. 5a in an operative condition.
Figure 7:
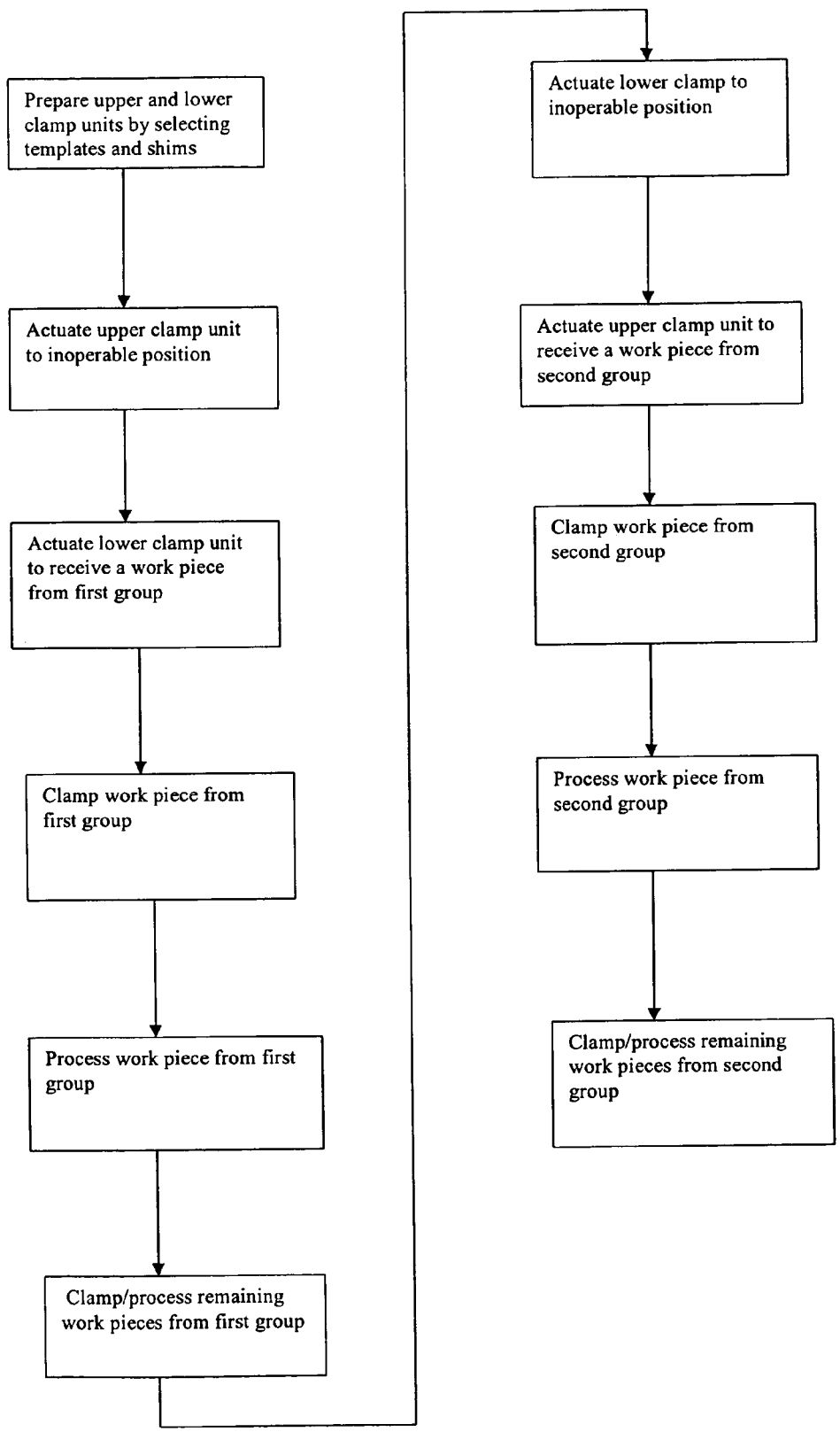
FIG. 7 is a flow diagram of a method of clamping work pieces.

The clamp device shown in FIGS. 5a to 5c is part of a work piece processing system illustrated in FIG. 6. In this view, the clamp unit 14b is shown angularly offset relative to the clamp unit 14a. This allows clamps 14a and 14b to function independently of one another while reducing possible interruption of clamp 14a by clamp 14b when the latter is in its inoperative position. Furthermore, the lower clamp member 30 and the intermediate clamp member 32 have a distal region which is angled relative to a corresponding proximal region of each as can be seen by the angle "theta" in FIG. 5a. This angle corresponds to the angle of offset "phi" seen in FIG. 6.

FIG. 6 also shows a number of clamp devices. For example, the clamp device 100 is a mirror image of clamp device 14 while the clamp device 110 has a pair of clamp members which work in tandem and are not angularly disposed relative to one another.

The system is used as follows, with reference to FIG. 6 which illustrates a door frame assembly 112 and a plurality of clamp assemblies, including a pair of clamping devices 14a, 14b as described herein. First, the set-up jig is prepared with as many clamp devices 14 as needed for the clamping surfaces identified and the templates appropriately selected for the work piece types being processed, in this case, the two production runs of work pieces sharing common clamping surfaces. In each case, the templates are selected to provide the required fine tuning adjustment. The clamp units are then connected to the controller.

With the system ready to begin, the production line is started. If the first production run is to process work pieces W1, the actuators 40 are actuated to bring the jaw 38 to its inoperative position as shown in dashed lines at 38' in FIG. 5a. This enables the lower clamp unit to be operative in this particular example, it being understood that there may be other specific examples of the present invention where the lower and upper clamps may be used simultaneously.

Next, the controller actuates the actuator 34 to move the jaw 32 to its open position (as shown in dashed lines at 32') where it is spaced from the jaw 30. Next, the work piece W1 is delivered to the jig and the controller actuates the actuator 34 to bring the lower clamp unit 14a to a clamped position against the corresponding clamping site on the work piece, in advance of a predetermined processing step by the robot 20.

Once the robot has finished its processing step, the actuator releases jaw 32 and opens the clamping device and the sequence is repeated until all of the work pieces W1 of the first production run are processed. The controller then is signalled to implement a change to prepare for the next production run, in which case the actuator 34 is actuated to bring the jaw 32 to a closed neutral position adjacent jaw 30 and jaw 38 is positioned in a ready open position to receive the work piece W2 in succession through the second production run. It will be understood that there may be cases where the jaw 32 actually abuts jaw 30 depending on the shim adjustments made before carrying out the procedure.

Thus, the controller is operable in:
- a first phase to actuate the lower clamp unit between unclamped and clamped positions;
- a second phase to actuate the second upper clamp member between the unclamped and inoperative positions; and
- a third phase to actuate the upper clamp unit between the unclamped and clamped positions.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

It will be appreciated that, while the preferred embodiment herein utilize clamp units 14a, 14b that more than two, such as three or more clamp units may also be used.

The invention claimed is:

1. A clamp device comprising a support frame member, a lower clamp unit supported by the support frame member for clamping a first work piece at a first lower elevation and an upper clamp unit supported by the support frame member for clamping a second work piece at a second upper elevation, the lower clamp unit having a pair of lower jaws to hold the first work piece and first actuating means for actuating at least one of the lower jaws between clamped and unclamped positions, the upper clamp unit having a first upper jaw and a second upper jaw to hold the second work piece, and a second actuating means for actuating at least one of the upper jaws between clamped and unclamped positions, the first upper jaw being fixed with a first of said lower jaws to form an intermediate jaw arrangement for movement therewith between the clamped and unclamped positions, the intermediate jaw arrangement being located above the first lower elevation and below the second upper elevation, the lower clamp unit further comprising a lower anchor portion mounted on the support frame member the first lower jaw including a first member pivotally coupled to the lower anchor portion for movement about a first axis and a second member coupled to the first member, the upper clamp unit further comprising an upper anchor portion which is mounted on the support frame member, the second upper jaw being movable relative to the upper anchor portion, the second upper jaw including a third member pivotally coupled to the upper anchor portion for movement about a second axis and a fourth member which is coupled to the third member.

2. A device as defined in claim 1, further comprising displacement means for displacing the second upper jaw between the unclamped position and an inoperable position.

3. A device as defined in claim 1 wherein the second lower jaw is fixedly mounted to the lower anchor portion.

4. A device as defined in claim 1 wherein each of the first and second actuating means includes a linear or rotary, hydraulic or pneumatic drive member.

5. A device as defined in claim 1, further comprising control means for which is operable in:
- a first phase to actuate the lower clamp unit between unclamped and clamped positions;
- a second phase to actuate the second upper clamp member between the unclamped and inoperative positions; and
- a third phase to actuate the upper clamp unit between the unclamped and clamped positions.

6. A device as defined in claim 1, wherein each of the lower jaws and/or each of the upper jaws is operable to receive one of a number of templates to accommodate differences from one work piece type to another.

7. A device as defined in claim 1, wherein each of the lower jaws and/or each of the upper jaws includes a template to provide a clamp surface which is tailored to the corresponding work piece.

8. A clamp device capable of clamping two different work pieces, comprising a lower pair of clamp members for clamping a first work piece and an upper pair of clamp members for clamping a second work piece, actuating means for actuating the lower and upper clamp members between respective clamped and unclamped positions, at least one of the upper clamp members being moveable between the unclamped position and a retracted position wherein the upper pair of clamp members are inoperable, one of the upper clamp members being fixed to one of the lower clamp members to form an intermediate jaw arrangement, the intermediate jaw arrangement being above the first work piece and below the second work piece in the clamped position, at least one of the lower clamp members being pivotally connected for movement about a first axis and at least one of the upper clamp members being pivotally connected for movement about a second axis.

9. A device as defined in claim 8, wherein each of the lower clamp members and/or each of the upper clamp members is operable to receive one of a number of templates to accommodate differences from one work piece type to another.

10. A device as defined in claim 8, wherein each of the lower clamp members and/or each of the upper clamp members includes a template to provide a clamp surface which is tailored to the corresponding work piece.

11. A clamp device capable of clamping two different work pieces, comprising a support frame member, a lower jaw unit, an intermediate jaw unit and an upper jaw unit, the lower jaw unit having a first upwardly facing clamp surface and the intermediate jaw unit having a first downwardly facing clamp surface to clamp a first work piece, the intermediate jaw unit having a second upwardly facing clamp surface and the upper jaw unit having a second downwardly facing clamp surface to clamp a second work piece, first actuating means for actuating either the lower jaw unit or the intermediate jaw unit or both to clamp the first work piece, second actuating means for actuating either the intermediate jaw unit or the upper jaw unit or both to clamp the second work piece, the upper jaw unit or the lower jaw unit or both being pivotally movable between an operative position and an inoperative position, the intermediate jaw unit including a first member pivotally connected to the support frame member for movement about a first axis and a second member coupled to the first member.

12. A device as defined in claim 11, further comprising a lower anchor portion mounted on the support frame member, the intermediate jaw unit being pivotally movable relative to the lower anchor portion.

13. A device as defined in claim 12, wherein the lower jaw unit is fixedly mounted to the lower anchor portion.

14. A device as defined in claim 11, further comprising an upper anchor portion mounted on the support frame member, the upper jaw unit being pivotally movable relative to the upper anchor portion.

15. A work piece clamp assembly for supporting at least two different work pieces, comprising a frame, a plurality of clamp devices mounted on the frame and operable in a first phase to clamp a first work piece at a corresponding plurality of clamping sites thereon and at a first elevation, and in a second phase to clamp a second work piece at a corresponding plurality of clamping sites thereon and at a second elevation, each of the clamp devices having a lower pair of clamp members for clamping the first work piece and an upper pair of clamp members for clamping the second work piece, one of the upper clamp members being fixed to one of the lower clamp members, the fixed upper and lower clamp members being located between the first and second elevations in the first and second phases, actuating means for actuating the lower and upper clamp members between respective clamped and unclamped positions, at least one of the upper clamp members or at least one of the lower clamp members being moveable between the unclamped position and a retracted position wherein the corresponding upper pair of clamp members or the corresponding lower pair of clamp members is inoperable and at least one of the lower clamp members being pivotally connected to the frame for movement about a first axis and at least one of the upper clamp members being pivotally connected to the frame for movement about a second axis.

16. A work piece clamp assembly for supporting at least two different work pieces, comprising a frame, a plurality of clamp devices mounted on the frame and operable in a first phase to clamp a first work piece at a corresponding plurality of clamping sites thereon and in a second phase to clamp a second work piece at a corresponding plurality of clamping sites thereon, wherein the clamping sites on the first work piece are in substantially the same location as the clamping sites on the second work piece, each clamp device comprising a lower jaw unit, an intermediate jaw unit and an upper jaw unit, the intermediate jaw unit being located below the upper jaw unit and above the lower jaw unit, the lower jaw unit and the intermediate jaw unit having adjacent clamp surfaces to clamp a first work piece, the intermediate jaw unit and the upper jaw unit having adjacent clamp surfaces to clamp a second work piece, first actuating means for actuating either the lower jaw unit or the intermediate jaw unit or both to clamp the first work piece, second actuating means for actuating either the intermediate jaw unit or the upper jaw unit or both to clamp the second work piece, the upper jaw unit being movable between an operative position and a retracted position, the retracted position being selected to permit the first work piece to be clamped and the operative position being selected to permit the second work piece to be clamped, the lower jaw unit and/or the intermediate jaw unit being pivotally connected to the frame for movement about a first axis, the intermediate jaw unit and/or the upper jaw unit being pivotally connected to the frame for movement about a second axis.

17. A clamp device comprising a support frame member, a lower clamp unit and an upper clamp unit supported by the support frame member, the lower clamp unit having a first lower jaw and a second lower jaw, at least one of the lower jaws being pivotally connected to the support frame for movement about a first axis, first actuating means for actuating at least one of the lower jaws between clamped and unclamped positions, the upper clamp unit having a first upper jaw and a second upper jaw, at least one of the first and second upper jaws being pivotally connected to the support frame for movement about a second axis, a second actuating means for actuating at least one of the upper jaws between clamped and unclamped positions, the first upper jaw being fixed with the first lower jaw for movement therewith, the first upper and lower jaws being located above the second lower jaw and below the second upper jaw.

* * * * *

UNITED STATES PATENT AND TRADEMARK OFFICE
CERTIFICATE OF CORRECTION

| | |
|---|---|
| PATENT NO. | : 7,036,808 B2 |
| APPLICATION NO. | : 10/964983 |
| DATED | : May 2, 2006 |
| INVENTOR(S) | : Cheah |

Page 1 of 1

It is certified that error appears in the above-identified patent and that said Letters Patent is hereby corrected as shown below:

Column 9, Line 45 (Claim 1, Line 19), after "member", insert --,--.

Column 9, Line 65 (Claim 5, Line 2), after "means", delete --for--.

Signed and Sealed this

Nineteenth Day of September, 2006

JON W. DUDAS
*Director of the United States Patent and Trademark Office*